(12) United States Patent
Jung et al.

(10) Patent No.: US 8,084,155 B2
(45) Date of Patent: Dec. 27, 2011

(54) LITHIUM RECHARGEABLE BATTERY

(75) Inventors: Sang Sok Jung, Youngin-si (KR); Se Yun Kim, Youngin-si (KR)

(73) Assignee: Samsung SDI Co., Ltd., Suwon (KR)

( * ) Notice: Subject to any disclaimer, the term of this patent is extended or adjusted under 35 U.S.C. 154(b) by 1123 days.

(21) Appl. No.: 11/250,572

(22) Filed: Oct. 17, 2005

(65) Prior Publication Data

US 2006/0115726 A1 Jun. 1, 2006

(30) Foreign Application Priority Data

Oct. 18, 2004 (KR) .................. 10-2004-0083268

(51) Int. Cl.
*H01M 2/36* (2006.01)
*H01M 2/12* (2006.01)
*H01M 2/08* (2006.01)

(52) U.S. Cl. .............. 429/72; 429/82; 429/185

(58) Field of Classification Search .......... 429/72, 429/82–89, 162, 164
See application file for complete search history.

(56) References Cited

U.S. PATENT DOCUMENTS

| | | | | |
|---|---|---|---|---|
| 6,083,640 A | * | 7/2000 | Lee et al. | 429/94 |
| 6,232,011 B1 | * | 5/2001 | Azema | 429/61 |
| 2003/0091893 A1 | * | 5/2003 | Kishiyama et al. | 429/94 |
| 2004/0126650 A1 | * | 7/2004 | Kim | 429/61 |
| 2004/0126656 A1 | * | 7/2004 | Cho | 429/181 |
| 2004/0228061 A1 | * | 11/2004 | Kim et al. | 361/103 |
| 2005/0042508 A1 | * | 2/2005 | Kim et al. | 429/174 |

FOREIGN PATENT DOCUMENTS

| | | |
|---|---|---|
| JP | 10-189034 | 7/1998 |
| JP | 11-204094 | 7/1999 |
| JP | 2002-100330 | 4/2002 |
| KR | 10-2001-0048102 | 6/2001 |
| KR | 10-2004-0058922 | 7/2004 |

* cited by examiner

*Primary Examiner* — Patrick Ryan
*Assistant Examiner* — Muhammad Siddiquee
(74) *Attorney, Agent, or Firm* — H.C. Park & Associates, PLC

(57) ABSTRACT

A lithium rechargeable battery includes an insulation case positioned on top of an electrode assembly where the insulation case has least one hole to improve the stability of the battery by evacuating gas that may be generated by the electrode assembly.

12 Claims, 6 Drawing Sheets

LITHIUM RECHARGEABLE BATTERY

This application claims priority to and the benefit of Korean Patent Application No. 10-2004-0083268, filed on Oct. 18, 2004, which is hereby incorporated by reference for all purposes as if fully set forth herein.

BACKGROUND OF THE INVENTION

1. Field of the Invention

The present invention relates to a lithium rechargeable battery adapted to more easily evacuate gas generated inside the battery and improve the stability of the battery.

2. Discussion of the Background

As portable electronic appliances continue to be made lighter and more compact, small-sized high-capacity batteries have become increasingly necessary as a power source. Lithium rechargeable batteries are increasingly used in the industry because they have a high energy density per unit weight and an operating voltage of 3.6V, which is three times larger than that of nickel-hydrogen or nickel-cadmium batteries.

Lithium rechargeable batteries create electric energy by oxidation and reduction reactions that occur during intercalation and deintercalation of lithium ions at the positive and negative electrodes. Materials enabling lithium ions to undergo reversible intercalation and deintercalation are used as the active materials of the positive and negative electrodes. An organic electrolyte or a polymer electrolyte is used to fill the space between the positive and negative electrodes.

Lithium-containing metal oxide may be used as the positive electrode active material of the lithium rechargeable batteries. Examples of a lithium-containing metal oxide include lithium cobalt oxide ($LiCoO_2$), lithium nickel oxide ($LiNiO_2$), and lithium manganese oxide ($LiMnO_2$).

Lithium or lithium alloy is conventionally used as the negative electrode active material. Lithium has the drawback that the batteries tend to short-circuit and explode due to dendrite formation. To overcome this problem, lithium has been replaced by carbon-based materials, including amorphous and crystalline carbon. The lithium rechargeable batteries are manufactured in various shapes including cylinders, squares, and pouch types.

FIG. 1 is an exploded perspective view showing a conventional lithium rechargeable battery.

Referring to FIG. 1, a lithium rechargeable battery is formed by placing an electrode assembly 12 including a first electrode 13, a second electrode 15, a separator 14, and an electrolyte into a can 10 and sealing the opening of the can 10 with a cap assembly 70.

The cap assembly 70 includes a cap plate 71, an insulation plate 72, a terminal plate 73, and an electrode terminal 74. The cap assembly 70 is coupled to the opening of the can 10 and to a separate insulation case 79 that seals the can 10.

The cap plate 71 is made of a metal plate with a size and a shape corresponding to the shape of the opening of the can 10. The cap plate 71 has a terminal through-hole of predetermined size formed at its center, into which the electrode terminal 74 is inserted. A tubular gasket 75 is coupled to the outer surface of the electrode terminal 74 to insulate the electrode terminal 74 from the cap plate 71. The cap plate 71 has an electrolyte injection hole 76 of predetermined size formed on a side. The cap assembly 70 is connected to the top opening of the can 10. An electrolyte is injected via the electrolyte injection hole 76, and the electrolyte injection hole 76 is then sealed by a plug 77.

The electrode terminal 74 is electrically connected to a second electrode tab 17 of the second electrode 15 or to a first electrode tab 16 of the first electrode 13 via the terminal plate 73, which acts as a second or first electrode terminal. Insulation tapes 18 are wound around portions of the electrode assembly 12 through which the first electrode tab 16 and the second electrode tab 17 are drawn to avoid a short circuit between the electrodes 13 and 15. The first electrode 13 or the second electrode 15 may act as either a positive electrode or a negative electrode.

A conventional lithium rechargeable battery is in danger of fracture if the voltage abruptly rises due to an internal or external short circuit or overcharging or over-discharging of the electrode assembly. When the battery is overcharged, excessive deintercalation of lithium occurs at the positive electrode and excessive intercalation of lithium occurs at the negative electrode. This renders the positive and negative electrodes thermally unstable and generates radical heating reactions, including decomposition of the organic solvent of the electrolyte, reaction between the negative electrode active material and the electrolyte, and solid electrolyte interface (SEI) film thermal decomposition reaction of the negative electrode. In addition, a thermal runaway phenomenon occurs and seriously degrades the stability of the battery.

The lithium rechargeable battery is equipped with a safety device, such as a positive temperature coefficient (PTC) thermistor or a safety vent to prevent the battery from catching fire or exploding due to an abnormality. The safety vent is formed on the cap plate or on the can and is adapted to open at a predetermined pressure to evacuate gas inside the battery to the exterior.

Despite being equipped with such a safety device, the danger remains that the safety device may fail to function in time to avoid a fracture if gas is not properly evacuated from the electrode assembly.

SUMMARY OF THE INVENTION

The present invention provides a lithium rechargeable battery that includes an insulation case that is provided with a hole to evacuate gas generated from an electrode assembly to a safety vent and thereby improve the stability of the battery.

Additional features of the invention will be set forth in the description which follows, and in part will be apparent from the description, or may be learned by practice of the invention.

The present invention discloses a lithium rechargeable battery that includes an electrode assembly with first and second electrodes wound together with a separator interposed between them, an insulation case positioned on top of the electrode assembly, and a can containing the electrode assembly and the insulation case, where the insulation case has at least one of an electrolyte injection hole and an electrode tab drawing hole, and at least one other hole.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrated embodiments of the invention and together with the description serve to explain the principles of the invention.

FIG. 2b shows a top view of the insulation case shown in FIG. 2a.

FIG. 3b shows a top view of the insulation case shown in FIG. 3a.

FIG. 4b shows a top view of the insulation case shown in FIG. 4a.

FIG. 5b shows a top view of the insulation case shown in FIG. 5a.

DETAILED DESCRIPTION OF THE ILLUSTRATED EMBODIMENTS

Figure 1:
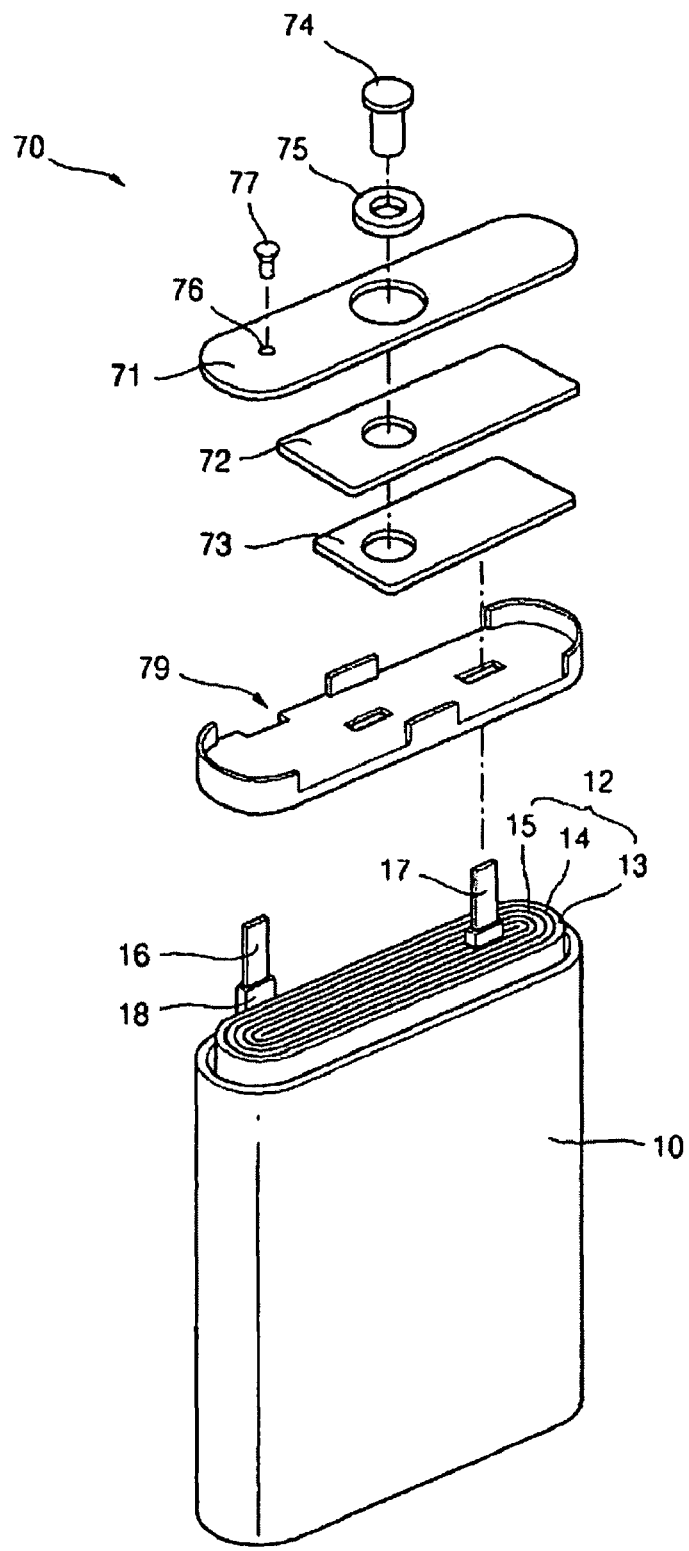
FIG. 1 shows an exploded perspective view of a conventional lithium rechargeable battery.

According to an exemplary embodiment of the present invention, a lithium rechargeable battery includes an insulation case provided with a hole to more easily evacuate gas that may be generated due to overcharging or short-circuiting. The evacuation of gas improves the stability of the battery.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity.

It will be understood that when an element such as a layer, film, region or substrate is referred to as being "on" another element, it can be directly on the other element or intervening elements may also be present. In contrast, when an element is referred to as being "directly on" another element, there are no intervening elements present.

Figure 2A:
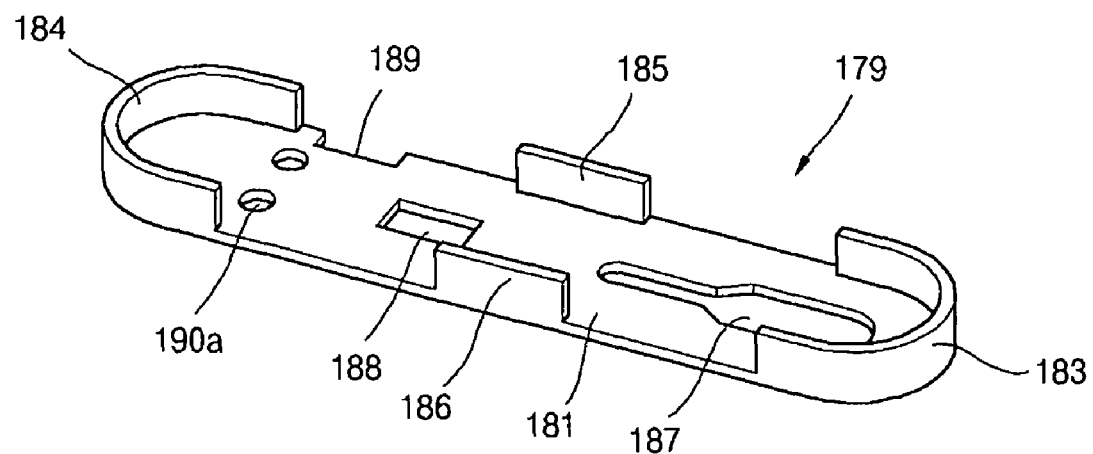
FIG. 2a shows a perspective view of an insulation case according to an exemplary embodiment of the present invention.
Figure 2B:
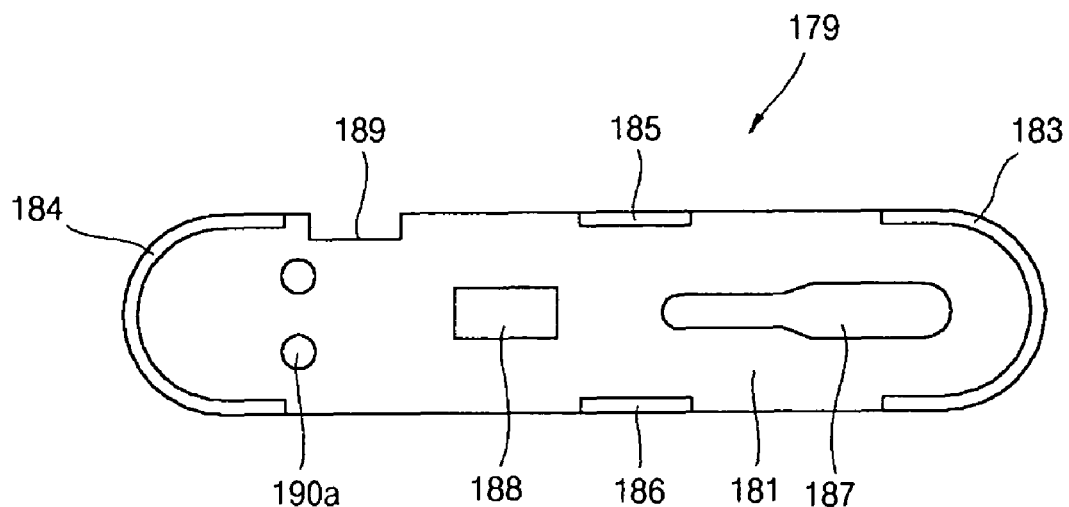

Referring to FIG. 2a and FIG. 2b, an insulation case 179 for a lithium rechargeable battery according to an exemplary embodiment of the present invention includes a main body 181, at least one hole 190a formed on the main body 181, short supporters 183 and 184, and long supporters 185 and 186. The main body 181 is shaped so that it can be inserted into a can of the lithium rechargeable battery.

The main body 181 has a circular hole 190a formed on its short side. The hole 190a acts as an evacuation conduit to move gas that may be generated when the battery short-circuits or overcharges to a safety vent so that the gas can escape more easily. The hole 190a prevents the electrode assembly from expanding and improves the battery's stability by facilitating the actuation of the safety vent when the internal pressure of the battery rises.

The hole 190a may have any shape, including, but not limited to, a circle, an ellipse, a semi-circle, a square, a triangle, a lozenge, and any combination thereof. The hole 190a may be formed anywhere on the main body 181a, including on a long side, a short side, or the central portion. The structural integrity of the main body 181 is best maintained when the hole 190a is positioned on a side of the main body 181, particularly on a short side. The hole 190a may also be formed as a groove cut out of the edge of the main body 181.

The hole 190a may be positioned near a safety vent, for example, below or directly below the safety vent. The hole 190a most easily facilitates the actuation of the safety vent on the can or cap plate when it is located directly below the safety vent.

The size and number of the holes 190a are selected so as to avoid degrading the structural integrity of the main body 181. Otherwise, the main body 181 may deform and cause the battery to short-circuit when the battery is subjected to a physical impact, for example, during a drop test.

The main body 181 has short side supporters 183 and 184 formed on its short side. The short side supporters 183 and 184 extend upward to a predetermined height. The short side supporters 183 and 184 support the main body 181 and enhance the adhesion of the main body 181 to the inner wall of the can to prevent the insulation case 179 from floating when the insulation case 179 is placed into the can.

The main body 181 may have at least one long side supporter 185 and 186 formed on its long side. The long side supporters 185 and 186 extend upward to a predetermined height. The height of the long side supporters 185 and 186 may be identical to the height of the short side supporters 183 and 184. The long side supporters 185 and 186 are placed in a predetermined position on the long side of the main body 181. The long side supporters 185 and 186 reinforce the strength of the long side of the main body 181, which is weaker than the short side, and prevent the main body 181 from deforming when the battery is subjected to physical impact.

The short side supporters 183 and 184 and the long side supporters 185 and 186 may be formed integrally with the main body 181, for example, during injection molding.

The main body 181 has an electrode tab drawing hole 187 formed on one side, through which an electrode tab can be drawn out, and an electrolyte injection hole 188 formed on the other side, through which an electrolyte can flow into the electrode assembly 12. Alternatively, the electrolyte injection hole 188 may be omitted. The main body 181 has a groove 189 with a predetermined width formed on one of its long sides, through which another electrode tab can be drawn out.

Figure 3A:
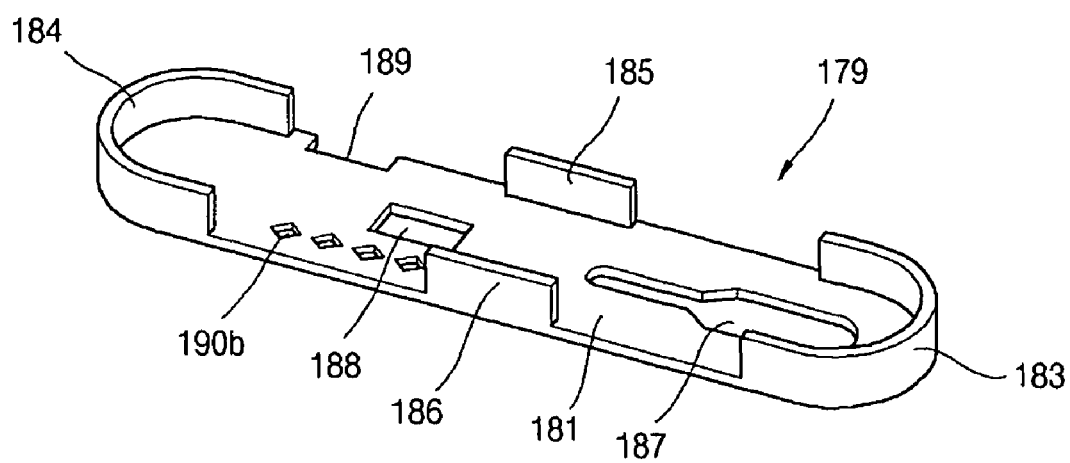
FIG. 3a shows a perspective view of an insulation case according to an exemplary embodiment of the present invention.
Figure 3B:
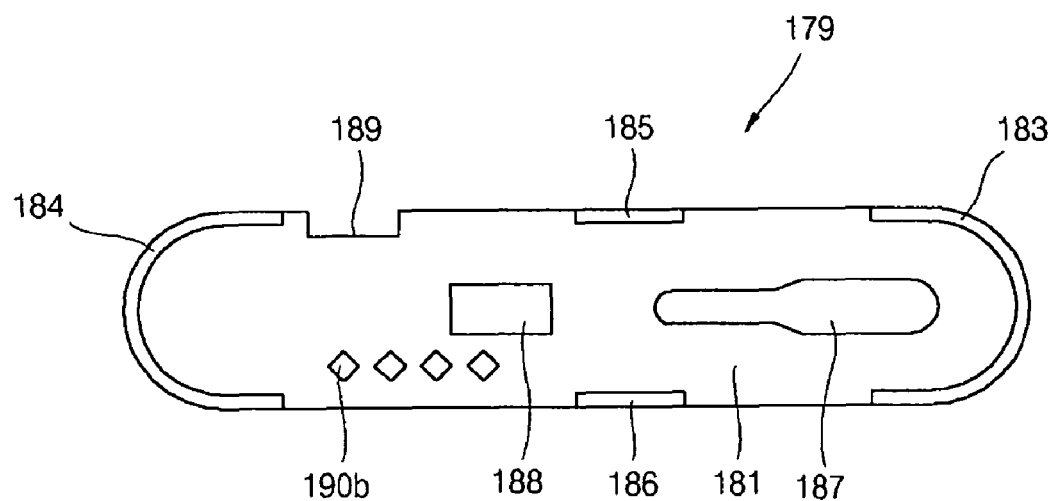

Referring to FIG. 3a and FIG. 3b, an insulation case 179 for a lithium rechargeable battery according to an exemplary embodiment of the present invention has a gas evacuation hole 190b formed on a long side of the main body 181 in the shape of a lozenge.

Figure 4A:
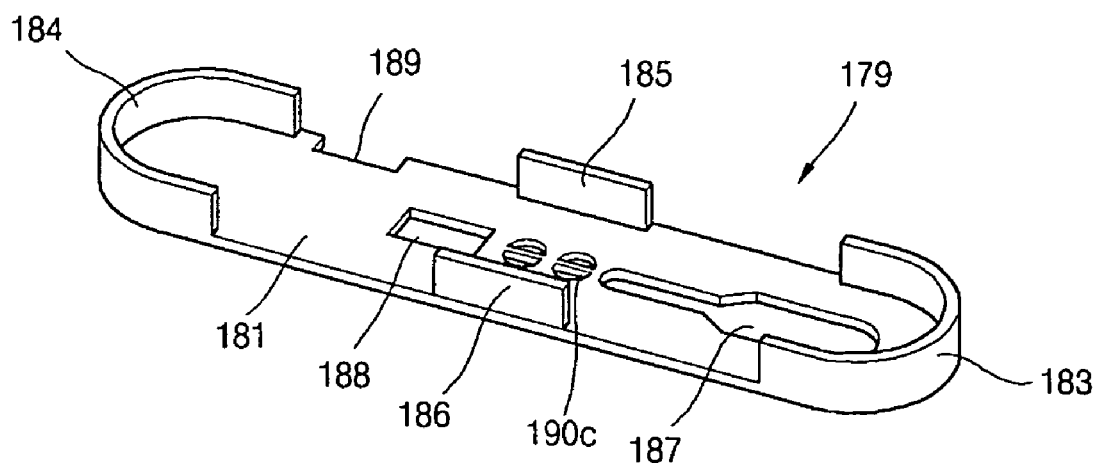
FIG. 4a shows a perspective view of an insulation case according to an exemplary embodiment of the present invention.
Figure 4B:
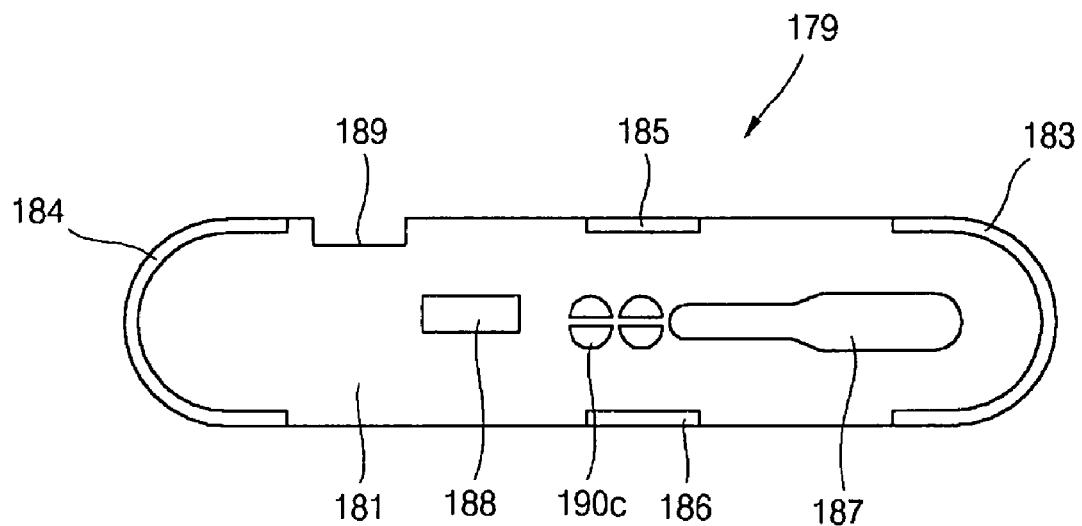

Referring to FIG. 4a and FIG. 4b, an insulation case 179 for a lithium rechargeable battery according to an exemplary embodiment of the present invention has a gas evacuation hole 190c formed on a central portion of the main body 181 in the shape of a semi-circle.

Figure 5A:
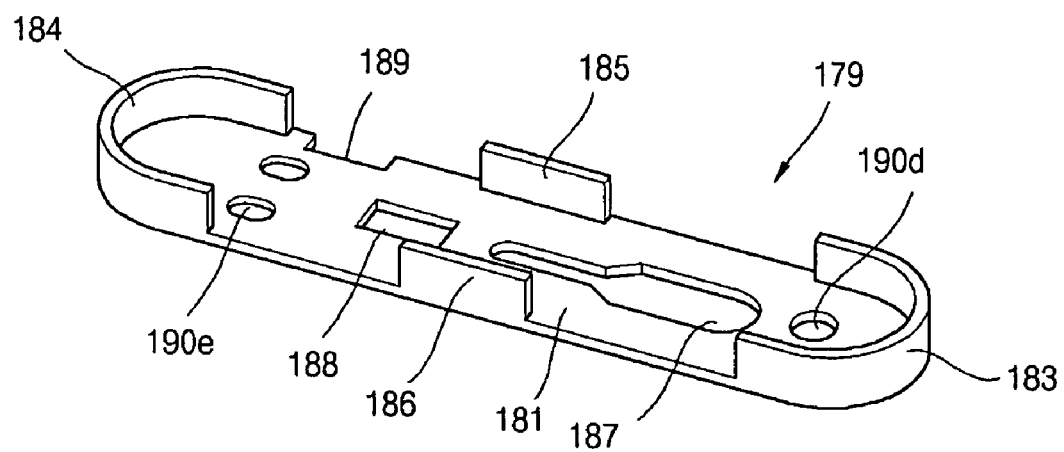
FIG. 5a shows a perspective view of an insulation case according to an exemplary embodiment of the present invention.
Figure 5B:
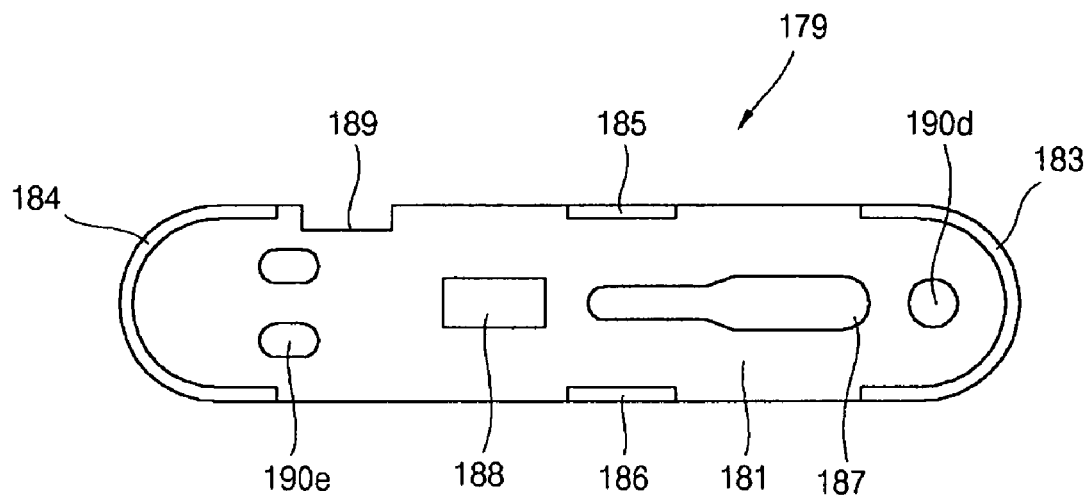

Referring to FIG. 5a and FIG. 5b, an insulation case 179 for a lithium rechargeable battery according to an exemplary embodiment of the present invention has gas evacuation holes 190d and 190e formed on both short sides of the main body 181 in the shape of a circle and an ellipse, respectively.

As shown in FIG. 2a, FIG. 3a, FIG. 4a, and FIG. 5a, the gas evacuation holes formed on the insulation case may have various shapes and positions. Additional combinations of size, shape, number, and positioning of the holes are possible.

Figure 6:
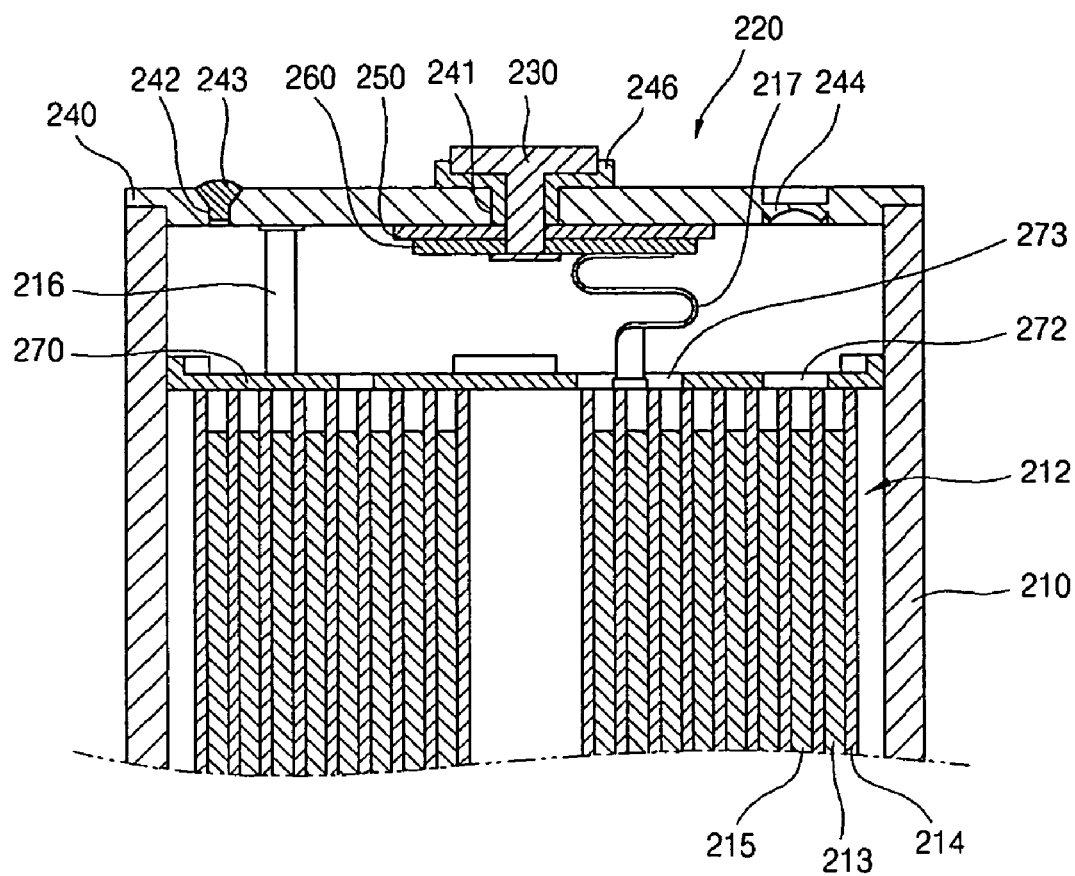
FIG. 6 shows a sectional view of a lithium rechargeable battery according to an exemplary embodiment of the present invention.

FIG. 6 is a sectional view showing a lithium rechargeable battery according to an exemplary embodiment of the present invention.

Referring to FIG. 6, the lithium rechargeable battery includes a can 210, an electrode assembly 212 contained in the can 210, and a cap assembly 220 coupled to the top of the can 210.

The can 210 has an approximately square shape with an open top and is made of a metallic material, which may be, but is not limited to, aluminum, aluminum alloy, or stainless steel. The can 210 itself may act as a terminal.

The electrode assembly 212 includes a first electrode 213, a second electrode 215, and a separator 214. The first electrode 213 and second electrode 215 may be laminated to each other with the separator 214 interposed between them and wound in a jelly-roll shape. The first and second electrodes 213 and 215 have first and second electrode tabs 216 and 217 attached to them, respectively. The first and second electrode tabs 216 and 217 extend upward.

The first and second electrodes 213 and 215 have opposite polarities. Either may act as a positive or negative electrode. Each of the first and second electrodes 213 and 215 include a collector and either a positive or negative electrode active material applied to at least one surface of the collector.

The positive electrode collector may be made of stainless steel, nickel, aluminum, titanium, or an alloy thereof or may be made of aluminum or stainless steel that has been surface-treated with carbon, nickel, titanium, or silver. An exemplary embodiment uses aluminum or an aluminum alloy. The negative electrode collector may be made of stainless steel, nickel, copper, titanium, or an alloy thereof or may be made of copper or stainless steel that has been surface-treated with carbon, nickel, titanium, or silver. An exemplary embodiment uses copper or a copper alloy.

The positive electrode active material may be lithium-containing transition metal oxide or a lithium chalcogenide compound. Examples of lithium-containing transition metal oxides include $LiCoO_2$, $LiNiO_2$, $LiMnO_2$, $LiMn_2O_4$, or $LiNi_{1-x-y}Co_xM_yO_2$ where $0 \leq x \leq 1$, $0 \leq y \leq 1$, $0 \leq x+y \leq 1$, and M is a metal such as Al, Sr, Mg, or La. The negative electrode active material may be crystalline or amorphous carbon, carbon composite such as thermally decomposed carbon, coke, or graphite, burned organic polymer compound, carbon fiber, tin oxide compound, lithium metal, or lithium alloy.

The separator 214 prevents a short circuit between the first and second electrodes 213 and 215 and provides lithium ions with a passage for movement. The separator 214 may be a film made of high-molecular polyolefin, such as polypropylene or polyethylene. The film may be a multiple film, a micro-porous film, a woven fabric, or a non-woven fabric.

The cap assembly 220, which is coupled to the top of the can 210, includes a cap plate 240, an insulation plate 250, a terminal plate 260, and an electrode terminal 230. The cap plate 240 is made of a metal plate and corresponds in size to the opening of the can 210. The cap plate 240 has a terminal through-hole 241 of a predetermined size formed at its center, an electrolyte injection hole 242 formed one side, and a safety vent 244 formed on the other side. The safety vent 244 may be placed anywhere so long as it does not interfere with the terminal through-hole 241 and the electrolyte injection hole 242. The safety vent 244 may, for example, be formed on the can 210 instead of the cap plate 240. In this exemplary embodiment, the safety vent 244 is integrally formed by reducing the sectional thickness of the cap plate 240. The electrolyte injection hole 242 is sealed by a plug 243.

The electrode terminal 230 is inserted into the terminal through-hole 241 and a tubular gasket 246 insulates the electrode terminal 230 from the cap plate 240. The insulation plate 250 is positioned on the lower surface of the cap plate 240. The terminal plate 260 is positioned on the lower surface of the insulation plate 250. The bottom of the electrode terminal 230 is electrically connected to the terminal plate 260 with the insulation plate 250 interposed between them.

Either the first electrode tab 216 or the second electrode tab 217 may be welded to the lower surface of the cap plate 240 and the other tab may be welded to the terminal plate 260. In this exemplary embodiment, for example, the first electrode tab 216 is welded to the lower surface of the cap plate 240 and the second electrode tab is welded to the terminal plate 260.

The electrode assembly 212 has an insulation case 270 positioned on its top to insulate the electrode assembly 212 from the cap assembly 220 and to fix the position of the electrode assembly 212 and the first and second electrode tabs 216 and 217. The insulation case 270 has an electrode tab drawing hole 273 and also has a gas evacuation hole 272 formed below the safety vent 244 on the cap plate 240. Gas generated by the electrode assembly 212 is easily evacuated via the gas evacuation hole 272 on the insulation case 270. This improves the stability of the battery and prevents the electrode assembly 212 from swelling.

The insulation case 270 is may be made of an insulating high-molecular resin, such as polypropylene (PP), polyphenylene sulfide (PPS), polyethersulfone (PES), or modified polyphenylene oxide (PPO). PPS has excellent heat resistance, dimensional stability, chemical-resistance, low absorptiveness, and is non-flammable. The electrical properties of PPS vary little as the temperature changes. PES is an amorphous aromatic plastic resin that is resistant to temperatures of up to 200° C. It also has excellent dimensional stability, water resistance, transparency, a high glass transition temperature of 223° C., a low degree of expansion of $2.3 \times 10^{-5}/°$ C., and good mechanical strength. Modified PPO is a non-flammable resin with excellent mechanical properties and heat resistance. Its physical properties undergo little degradation at low temperatures and contracts very little during shaping.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A lithium rechargeable battery, comprising:
an electrode assembly that includes first and second electrodes wound together with a separator interposed between them;
a cap assembly comprising a cap plate and an insulation plate;
an insulation case positioned on top of the electrode assembly and spaced apart from the cap assembly between the electrode assembly and the cap assembly; and
a can containing the electrode assembly and the insulation case,
wherein the cap plate is coupled to the top of the can,
wherein a safety vent is formed on the cap plate or the can,
wherein the insulation case has at least one of an electrolyte injection hole and an electrode tab drawing hole,
wherein the insulation case has at least one other hole, and
wherein the other hole is a gas evacuation hole and is positioned directly below the safety vent, wherein the insulation case has at least one supporter formed on its side and at least one portion on its side where the supporter is not formed.

2. The lithium rechargeable battery of claim 1, wherein the other hole has a shape selected from the group of a circle, an ellipse, a semi-circle, a square, a triangle, and a lozenge.

3. The lithium rechargeable battery of claim 1, wherein the other hole is formed on a long side of the insulation case.

4. The lithium rechargeable battery of claim 1, wherein the other hole is formed on a central portion of the insulation case.

5. The lithium rechargeable battery of claim 1, wherein the other hole is formed on a short side of the insulation case.

6. The lithium rechargeable battery of claim 1, wherein the other hole contacts an edge of the insulation case.

7. The lithium rechargeable battery of claim 1, wherein the insulation case is made of a high-molecular resin.

8. The lithium rechargeable battery of claim 7, wherein the molecular resin is one of polypropylene, polyphenylene sulfide, polyethersulfone, and modified polyethersulfone.

9. The lithium rechargeable battery of claim 1, wherein the at least one supporter extends upward.

10. The lithium rechargeable battery as claimed in claim 1, wherein the at least one supporter is integral with the insulation case.

11. The lithium rechargeable battery of claim 1, wherein the insulation case has one supporter formed on each of its four sides.

12. The lithium rechargeable battery of claim 1, wherein the insulation case has a plurality of other holes.

* * * * *